(12) United States Patent
Deng et al.

(10) Patent No.: US 11,656,854 B2
(45) Date of Patent: May 23, 2023

(54) METHODS AND DEVICES FOR COMPUTING A MEMORY SIZE FOR SOFTWARE OPTIMIZATION

(71) Applicant: HUAWEI TECHNOLOGIES CO., LTD., Shenzhen (CN)

(72) Inventors: Xun Deng, Markham (CA); Kai-Ting Amy Wang, Toronto (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/460,749

(22) Filed: Aug. 30, 2021

(65) Prior Publication Data
US 2023/0066702 A1 Mar. 2, 2023

(51) Int. Cl.
*G06F 8/41* (2018.01)
*G06F 8/30* (2018.01)

(52) U.S. Cl.
CPC ........... *G06F 8/441* (2013.01); *G06F 8/37* (2013.01); *G06F 8/433* (2013.01); *G06F 8/452* (2013.01); *G06F 8/457* (2013.01)

(58) Field of Classification Search
None
See application file for complete search history.

(56) References Cited

U.S. PATENT DOCUMENTS

| | | | | |
|---|---|---|---|---|
| 5,548,761 | A * | 8/1996 | Balasundaram | G06F 8/443 717/110 |
| 6,772,415 | B1 * | 8/2004 | Danckaert | G06F 8/452 712/241 |
| 7,398,484 | B2 * | 7/2008 | Ruf | G06F 12/0897 711/E12.043 |
| 10,831,688 | B2 * | 11/2020 | Jayaraman | G06F 13/4282 |
| 10,866,790 | B2 * | 12/2020 | Das | G06F 8/4434 |
| 11,426,656 | B2 * | 8/2022 | van der Laan | A63F 13/358 |
| 11,427,405 | B1 * | 8/2022 | Theobald | B25J 15/0683 |
| 11,429,379 | B2 * | 8/2022 | Jain | G06F 11/3612 |
| 11,429,555 | B2 * | 8/2022 | Kesiraju | G06F 9/3877 |
| 11,429,991 | B1 * | 8/2022 | Tran | G06Q 10/087 |
| 2006/0031652 | A1 | 2/2006 | Richter et al. | |

(Continued)

OTHER PUBLICATIONS

Peng et al. Model-Driven Tile Size Selection for DOACROSS Loops on GPUs, EURO-Par 2011 Parallel Processing, Sep. 2, 2011, 486 pages.

(Continued)

*Primary Examiner* — Philip Wang (57) ABSTRACT

There is provided methods and devices for computing a tile size for software optimization. A method includes receiving, by a computing device, information indicative of one or more of a set of loop bounds and a set of data shapes; processing, by the computing device, the information to determine a computation configuration based on the obtained information, the computation configuration implementable by a compiler, said processing including evaluating at least the computation configuration based on a build cost model, the build cost model representative of a data transfer cost and a data efficiency of the computation configuration; and transmitting, by the computing device, instructions directing the compiler to implement the computation configuration.

18 Claims, 5 Drawing Sheets

(56) References Cited

U.S. PATENT DOCUMENTS

| | | | |
|---|---|---|---|
| 2006/0048121 A1* | 3/2006 | Blainey | G06F 8/443 717/160 |
| 2006/0048122 A1* | 3/2006 | Barton | G06F 8/443 717/160 |
| 2009/0055815 A1* | 2/2009 | Chan | G06F 8/443 717/160 |
| 2009/0199169 A1* | 8/2009 | Lin | G06F 8/443 717/159 |
| 2014/0006751 A1* | 1/2014 | Aliseychik | G06F 11/3419 712/30 |
| 2015/0106596 A1* | 4/2015 | Vorbach | G06F 12/0875 712/221 |
| 2015/0135171 A1* | 5/2015 | Ishii | G06F 8/4441 717/150 |
| 2018/0365561 A1* | 12/2018 | Temam | G06N 3/08 |
| 2019/0042221 A1* | 2/2019 | Krishnaiyer | G06F 8/45 |
| 2019/0187963 A1* | 6/2019 | Bokhari | G06F 9/4881 |
| 2021/0255891 A1 | 8/2021 | Henretty et al. | |
| 2022/0156291 A1* | 5/2022 | Brodsky | G06F 16/248 |
| 2022/0229641 A1* | 7/2022 | Meister | G06F 8/71 |
| 2022/0276723 A1* | 9/2022 | Sirois | A61B 5/296 |
| 2022/0276865 A1* | 9/2022 | Rieber | G06F 9/30036 |

OTHER PUBLICATIONS

Liu, Song et al. An efficient tile size selection model based on machine learning EURO-Par 2011 Parallel Processing, Jun. 26, 2018 (Jun. 26, 2018), 15 pages.

Tavarageri, Sanket et al. Dynamic selection of tile sizes, https://www.researchgate.net/publication/220728061 May 20, 2014 (May 20, 2014), 10 pages.

Narasimhan, Kumudha et al. A Practical Tile Size Selection Model for Affine Loop Nests, hops://doi.org/10.1145/3447818.3462213, Jun. 17, 2021 (Jun. 17, 2021), 36 pages.

* cited by examiner

```
for (ii=0; ii<Bi; ii+=Ti) {
    for (jj=0; jj<Bj; jj+=Tj) {
        for (kk=0; kk<Bk; kk+=Tk) {
            for (i=ii; i<ii+Ti; i++) {
                for (j=jj; j<jj+Tj; j++) {
                    for (k=kk; k<kk+Tk; k++) {
                        C[i][j] += A[i][k] * B[k][j];
```

METHODS AND DEVICES FOR COMPUTING A MEMORY SIZE FOR SOFTWARE OPTIMIZATION

CROSS-REFERENCE TO RELATED APPLICATIONS

This is the first application filed for the present disclosure.

FIELD

The present disclosure pertains to the field of software optimization, and in particular to methods and devices for computing a memory size.

BACKGROUND

Tiling is an important loop transformation performed in code optimization, which stripes loop nests into smaller blocks and improves data access locality. Multi-level intermediate representation (MLIR) provides different levels of abstractions of intermediate representations named dialects and supports various transformations. Currently, tiling is available in the affine dialect and the linalg dialect in MLIR. While in the linalg dialect, users are required to specify how to tile the loop nests, the affine dialect can define a memory footprint accessed by the loop nest and calculate the tile size from that memory footprint.

Certain architectures may require software to manage the dynamic memory allocations (DMAs) and thus tiling may not be a luxury or a tool for performance optimization, however it is a functionality requirement for the compiler. Large loop nests can be split into smaller tiles to fit into the unified buffer and DMAs can be manually inserted by the compiler.

Accordingly, there is a need for methods and devices to provide better heuristics to perform tiling associated with memory, that are not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide methods and devices for software optimization.

An aspect of the disclosure provides for a method includes receiving, by a computing device, information indicative of a set of loop bounds and a set of data shapes. The method further includes processing, by the computing device, the information to determine a computation configuration based on the obtained information, the computation configuration being compiler implementable, said processing including evaluating at least the computation configuration based on a build cost model, the build cost model representative of a data transfer cost and a data efficiency of the computation configuration. The method further includes transmitting, by the computing device, instructions directing a compiler to implement the computation configuration. In some embodiments each loop bound of the set of loop bounds is static.

In some embodiments a subset of the set of loop bounds is static and a subset of the subset of loop bounds is dynamic.

In some embodiments each data shape of the set of data shapes is static. In some embodiments each data shape of the set of data shapes is dynamic. In some embodiments each loop bound of the set of loop bounds is dynamic. In some embodiments each data shape of the set of data shapes is static. In some embodiments each data shape of the set of data shapes is dynamic. In some embodiments the build cost model includes an objective function and a constraint size, the objective function indicative of a total dynamic memory allocation transfer cost and the constraint size indicative of a capacity of a cache. In some embodiments the build cost model further includes a data size of a tile that is less than or equal to the constraint size.

An advantage of the present disclosure is that it may allow for more accurate dynamic memory allocation (DMA) cost estimation by using a sophisticated build cost model. This can in turn reduce the number of DMA instructions that are required in certain scenarios. Further, the present disclosure supports multi-dimensional tiling and may allow for flexible tile shapes (e.g. data shapes) to serve as specific access patterns and memory reference data shapes.

Another aspect of the disclosure provides for a computing device. The computing device includes a processor, and a non-transient computer readable memory having stored thereon machine executable instructions which when executed by the processor configure the device to execute the methods disclosed herein. For example, such a computing device is configured to receive information indicative of a set of loop bounds and a set of data shapes, process the information to determine a computation configuration based on the obtained information, the computation configuration being compiler implementable, said processing including evaluating at least the computation configuration based on a build cost model, the build cost model representative of a data transfer cost and a data efficiency of the computation configuration, and transmit instructions directing a compiler to implement the computation configuration.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

DETAILED DESCRIPTION

Few existing tiling methods have the objective of minimizing data transfers given an available cache size. For example, automatic kernel generator (AKG) polyhedral tiling has the inherent objective to optimize for parallelizability, rather than minimizing the direct memory allocations (DMAs).

In embodiments of the present disclosure, an objective is defined as minimizing host-device, device-host data transfers. Thus, in order to obtain the desired tiling and loop interchange transformation, tiling is formulated as an optimization problem with a build cost model, that is essentially a function that models external transfers (e.g., a dynamic memory allocation (DMA) cost model), and a bounding function (e.g., constraint) to prevent exceeding the size of the device's side cache. In various embodiments disclosed herein, the build cost model may be referred to as a DMA cost model, or a tiling model that is based on the build cost for DMA. A loop interchange transformation as mentioned herein refers to a loop optimization wherein inner loops are exchanged with outer loops. This may be performed in order to ensure that elements in multi-dimensional arrays are accessed in the same manner as which they are present in memory, thereby improving locality of reference. Embodiments of the present disclosure further provide an integrated method to deal with static and dynamic loop bounds and memory references. Loop bounds (such as those in a 'for' loop in various computer languages) refers to the initial starting condition for a variable that the loop is dependent on, and the termination condition for the loop. Thus, loop bounds discussed herein may be fixed (i.e., static) or mutable (i.e., dynamic). Further, memory reference as discussed herein refers to memory locations that may be accessed by a computer processor.

Specific characteristics of loop bounds and memory reference (also referred to herein as data shapes) may thus be computed to determine a computation configuration that best suits the scenario, based upon a build cost model representing the data transfer cost and data efficiency. An advantage of the present disclosure is therefore that it may be able to identify optimization strategies based on the information relating to the loop bounds and data shapes.

Figure 1:
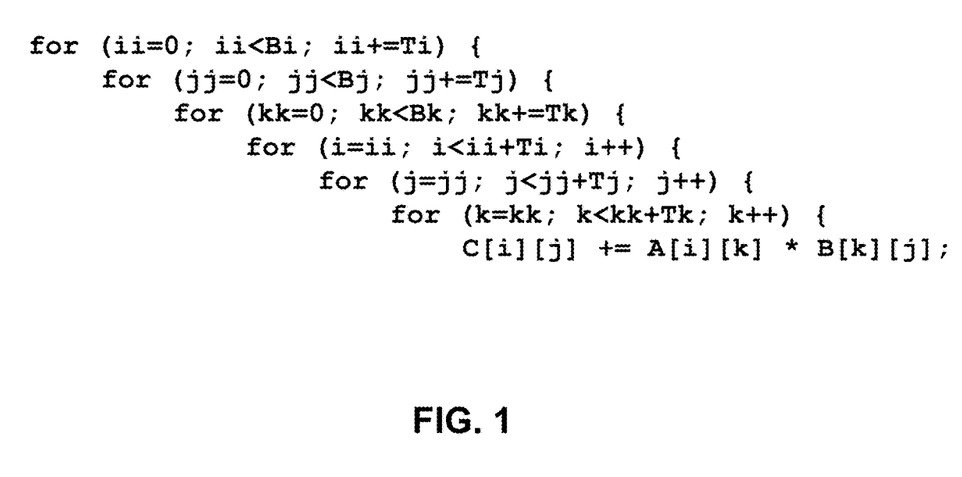
FIG. 1 depicts an example triply-nested loop with all three static axes tiled, according to embodiments.

FIG. 1 illustrates an example triply-nested loop with all three static axes tiled. Ti, Tj, Tk are the tiling factors, or tile sizes. By setting a tile size to be one (or tile-by-one), for example Tk=1, the kk loop will be incremented by 1 each time; the corresponding k loop will only iterate over one iteration.

The methods proposed by embodiments of present disclosure, to solve the above mentioned tiling problem, does so with the objective of minimizing the cost of DMA transfers. Tiling is formulated as an optimization problem with a constraint such that the amount of data brought into the cache cannot exceed the cache capacity. Embodiments of the present disclosure define a method to accommodate dynamic loop bounds and data shapes, and a global approach to allow for flexible tile shapes (e.g., the tile shapes need not be "square"). This may be accomplished by dividing tiling into three cases based on the information provided on the loop bounds and the data shapes of arrays (or tensors) accessed in the loop nests. The loop bounds and data shape arrays can be either static or dynamic (e.g., static loop bounds are known at compile time and dynamic loop bounds are unknown at compile-time). A tensor may be considered as a type of (potentially multidimensional) array possessing certain transformation properties, such that it is predictable how the array will transform under certain matrix transformations. This concept can be directly applied to the data shapes of memory and how the data shape of that memory may be transformed under specified operations. Thus, for a loop nest L, comprising n loops, and having a cache capacity C, the output of the method can be a set of tile sizes T for each loop $\{T_i\}$.

Figure 2:
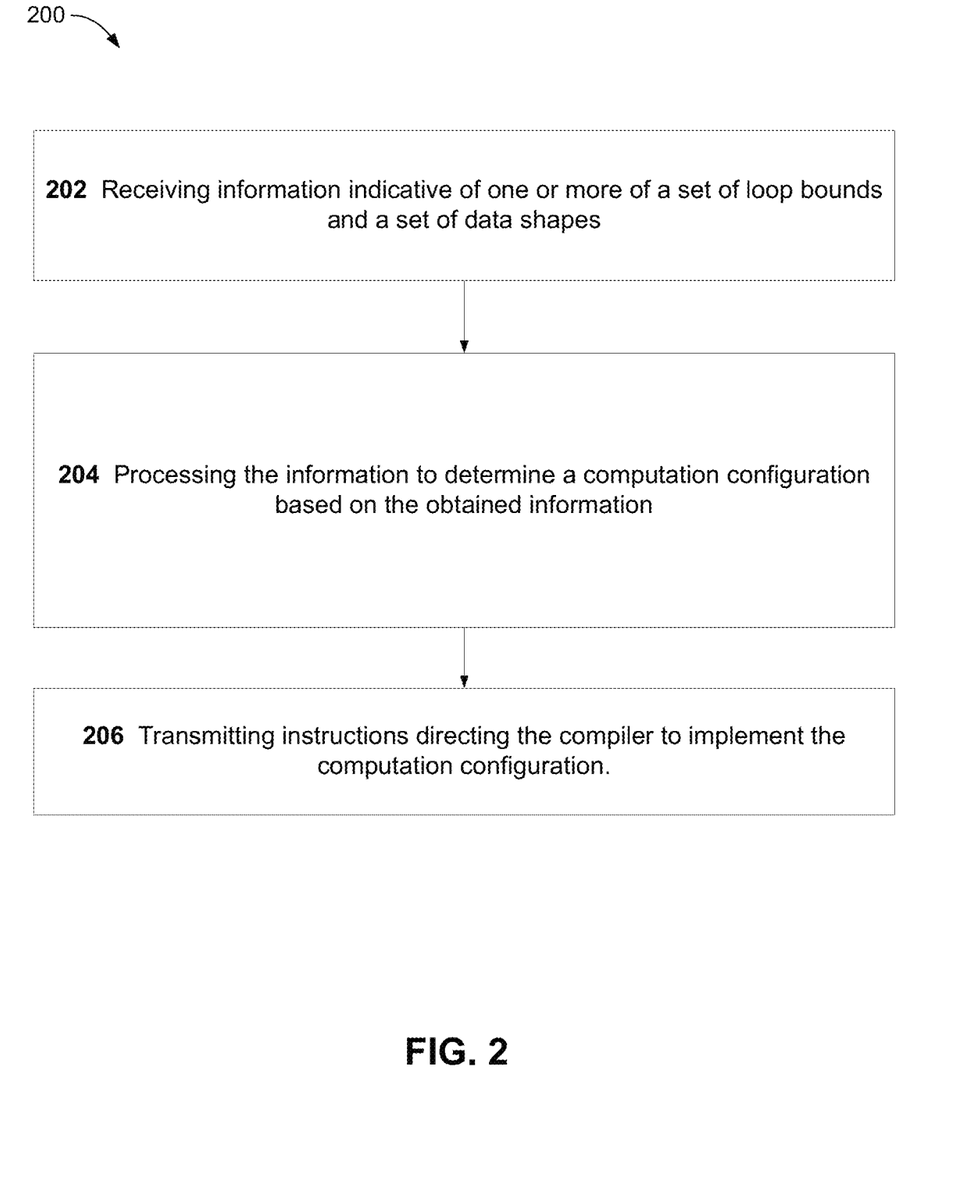
FIG. 2 depicts an example method for computing a tile size for software optimization, according to embodiments.

FIG. 2 is flowchart of an example method 200, which may compute a tile size for software optimization. The method 200 involves, at step 202, receiving by a computing device, information indicative of one or more of a set of loop bounds and a set of data shapes. For example, the information can be received from the compiler. In some instances, the computing device is the compiler and thus the information can be an internal transfer of information. In other instances, the compiler and the computing device are separate entities. As discussed above, loop bounds may include the start and termination conditions for loops such as 'for' loops, wherein a start condition and termination condition can define parameters for the commencement and finishing of calculations. Where a start condition (e.g. i) or termination condition (e.g. x) is defined at compile time (i.e. defined as i=0 or x=10), that loop bound is considered to be static. Where a loop bound may not be specifically defined at compile time, such as where a loop bound is defined by a variable (i.e., i=k), that loop bound is considered dynamic. Similarly, data shapes may be presented as an array of memory locations that may be transformed.

The method 200 further involves, at step 204, processing, by the computing device, the information to determine a computation configuration based on the obtained information, the computation configuration implementable by a compiler. As used in various embodiments of the present disclosure, a computation configuration refers to the desired tiling of memory that would result in the most efficient loop nest optimization. Loop nest optimization may include techniques such as the previously mentioned loop interchange, which may be used in the computation configuration to achieve the desired results. The processing performed by the computing device includes evaluating at least the computation configuration based on a build cost model, wherein the build cost model is representative of a data transfer cost and a data efficiency of the computation configuration. For example, a data transfer cost can define the number of cycles or time that is required for data transfer from a host device to the computing device. Additionally, data efficiency can be representative of an efficiency of the utilization of the cache or cache size of the computing device. For example, an optimal data efficiency can be indicative of a substantially full use of the cache without data overflow. The method 200 concludes, at step 206, by transmitting, by the computing device, instructions directing the compiler to implement the computation configuration.

In some embodiments each loop bound of the set of loop bounds may be static. A user may choose a "first approach," which uses an affine tiling formula as defined in Equation 1.

$$\text{(tile size } (Ti) = \left(\frac{\text{memory foot print}}{C}\right)^{\frac{1}{n}} \text{ for all } i \quad (1)$$

where: n is the number of loops in the loop nest, memory footprint is the size of memory accessed by the loop nest, and C is the cache size.

In some embodiments, the estimation of the tile size can be determined using a more global approach that includes the use of a DMA cost model that can be used to determine the desired tile sizes through a recursive approach. In the global approach, the data shapes can be static or dynamic as the memory footprint can be determined with an appropriate level of accuracy.

In some embodiments a subset of the set of loop bounds may be static while another subset of the set of loop bounds may be dynamic. In this situation, loop-interchange may be performed wherein the static loops are pushed towards the inner loops in the nest. Subsequently, a build cost model may be built. When data tensors have static data shapes, the build cost model may be adjusted using the data shapes as upper bounds, and the tile sizes for both the dynamic loops and the static loops may be determined simultaneously. This can be considered to be an equivalent determination process when compared to the instance where each loop bound of the set of loop bounds are static. If the data tensors have dynamic data shapes, the dynamic loops' tile sizes can be set to one when solving for the static loops' tile sizes. Based on the solved static tile sizes, recursive determination can be performed in order to adjust the enclosing dynamic tile sizes (e.g. increase the tile size from the initially assigned size of one to a size of two, or to other larger size, while ensuring the tile size assigned fits into the cache).

In some embodiments each loop bound of the set of loop bounds may be dynamic. If the data shapes are also dynamic, one-dimensional tiling can be performed. That is, only the innermost dynamic loop is tiled to a size greater than one, while all of the other dynamic loops are tiled by one (e.g., the tile sizes are set to one). This method can be advantageous as it provides a suitable determination when evaluating the tile size based on dynamic loop bounds and dynamic data shapes. If the data shapes are static, a build cost model can be built and adjusted using data shapes as upper bounds.

Figure 3:
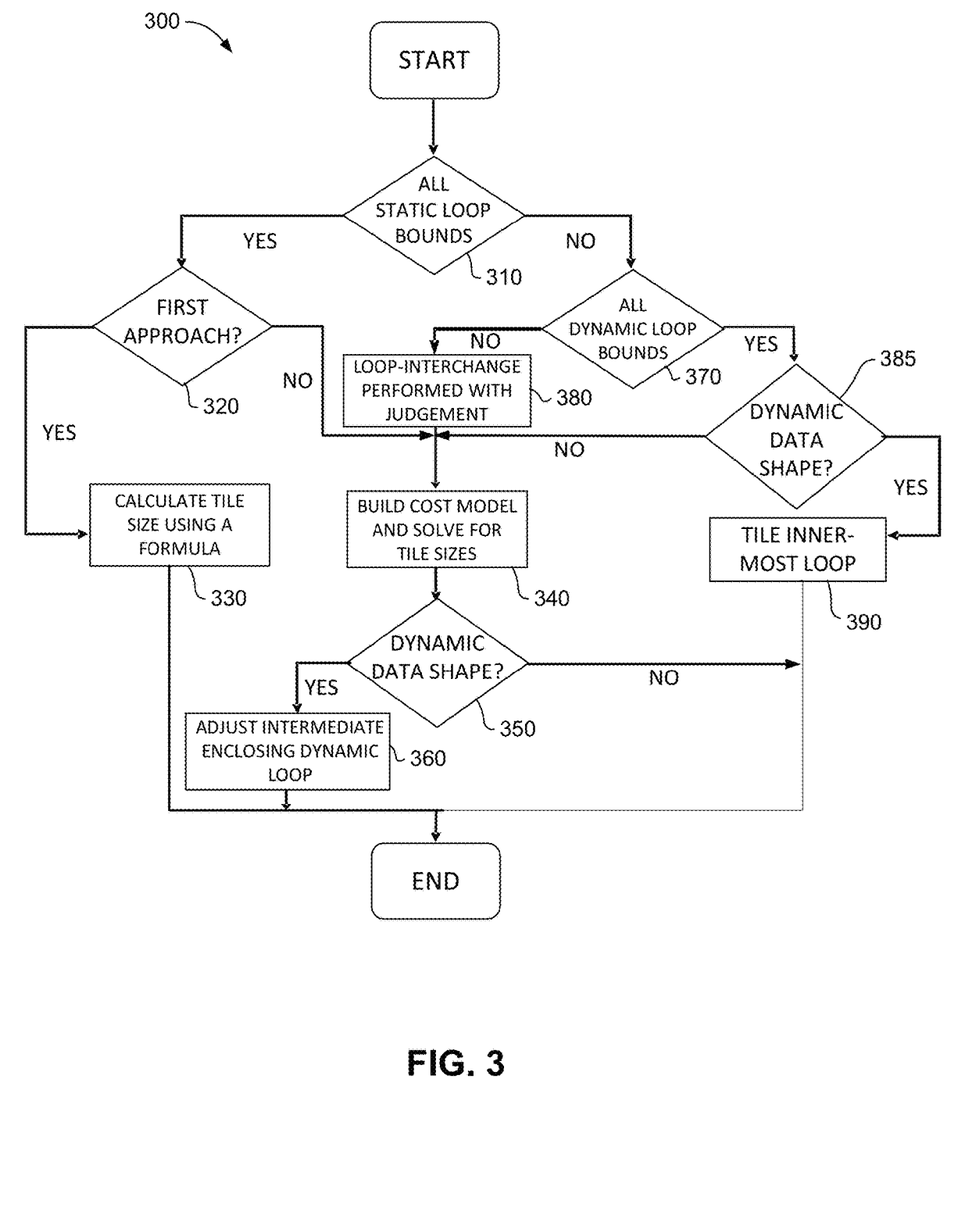
FIG. 3 depicts an example flowchart of a method, according to embodiments.

FIG. 3 is an example flowchart 300 of a method illustrating the steps and decisions that may be taken depending on the above described scenarios relating to static or dynamic loop bounds, and static or dynamic data shapes.

At step 310, if it is determined that the loop bounds are all static, a user may use a "first approach" 320, which uses an affine tiling formula 330, as defined above in Equation 1 to achieve a desired tiling. Instead of the "first approach" 320, the user may instead build a cost model and solve for the tile sizes at step 340. This includes determining, at step 350, whether the data shape is dynamic or not. If the data shape is not dynamic, the desired tiling is achieved, however if the data shape is determined to be dynamic, the intermediate enclosing dynamic loop is adjusted at step 360 to achieve the desired tiling.

If at step 310, it is determined that loop bounds are not all static, then it is determined, at step 370, whether all loop bounds are dynamic. If it is determined that the loop bounds are of a mixed type (i.e., some are static while others are dynamic), then at step 380, a loop interchange is performed under judgement. Following this, at step 340, the build cost model may be built to solve for the tile sizes. If the data shape is determined to be static, at step 350, no more action is required. If the data shape is determined to be dynamic, at step 350, then the intermediate enclosing dynamic loop is adjusted at step 360 to achieve the desired tiling.

If at step 370 it is determined that all loop bounds are dynamic, then at step 385 it is determined whether or not the data shape is dynamic. If it is determined, at step 385, that the data shape is static, then at step 340, the build cost model may be built to solve for the tile sizes. As the data shape has already been determined to be static, the desired tiling may be achieved by inferring loop bounds with tile data shapes. For example, using the data shapes to bound the memory footprint calculation may be more accurate and as such the desired tiling may be achieved by inferring loop bounds and use that loop bounds to calculate the memory access. If at step 385 the data shape is determined to be dynamic, then the inner-most loop is tiled, at step 390, and the remaining loop are tiled-by-one (i.e., set to one) in order to achieve the desired tiling.

According to embodiments, a sequence of steps for the implementation or definition of the flowchart illustrated in FIG. 3 is provided below. According to embodiments, the method may be represented as:

1 If all static loop bounds:
2 If first approach:
3

$$\text{solve } T = \left(\frac{\text{memory foot print}}{C}\right)^{\frac{1}{n}}$$

4 else:
5 build cost model and solve for T
6 else if mixed dynamic, static loop bounds:
7 loop-interchange performed under judgement
8 if static data shapes:
9 build cost model and solve for T by inferring loop bounds with data shapes
10 else:
11 build cost model solve for T with dynamic loop tile size setting to one
12 adjust the tile size of the intermediate enclosing dynamic loop
13 else:
14 if static data shape:
15 build cost model and solve for T by inferring loop bounds with data shapes
16 else:
17 tile the inner most loop and the rest tile-by-1 (i.e. setting to one)

In some embodiments each data shape of the set of data shapes is static. Where all of the loop bounds are static, the tile sizes may be calculated by building the cost model and solving for the tile sizes. Where some of the loop bounds are static while others are dynamic, the tile sizes may be achieved by first performing a loop interchange, and then building the cost model and solving for the tile sizes by inferring loop bounds with the data shapes. Where all of the loop bounds are dynamic, the tile sizes may be calculated by building the cost model and solving for the tile sizes while inferring loop bounds with the data shapes.

In some embodiments each data shape of the set of data shapes is dynamic. Where all of the loop bounds are statics, the tile sizes may be calculated by building the cost model and solving for the tile sizes. Where some of the loop bounds are static while others are dynamic, the tile sizes may be calculated by building the cost model to solve for the tile sizes, while setting the dynamic loop size setting to one, after which the tile size of the intermediate enclosing dynamic loop may be adjusted incrementally until a solution is found that still fits within the desired memory cache. Where all of the loop bounds are dynamic, the inner most loop may be tiled, after which the remaining loops may be tiled-by-one until the desired size is achieved that fits within the memory cache size.

In various embodiments of the present disclosure, the build cost model (for example, a tiling model) includes an objective function and a constraint size. The objective function is indicative of a total dynamic memory allocation transfer cost, while the constraint size is indicative of a capacity of a cache. The build cost model can be used in the cases that include all static loop bounds, mixed static and dynamic loop bounds, and all dynamic loop bounds. The objective function represents the total DMA transfer cost for transferring data from global memory to the device local cache. The constraint size is defined such that the memory inside each tile can fit into the cache. The build cost model further evaluates the amount of memory that is required for the computation. The inner most tile is split into two and the outer most tile is split into two, after which they are multiplied together. In some embodiments the build cost model further includes a data size of a tile that is less than or equal to the constraint size. According to embodiments, the objective function can be defined by Equation 2 and the constraint size can be defined by Equation 3.

$$\text{Cost} = G\left(\prod_{i=0}^{n} \frac{B_i}{T_i} * f(T)\right) \quad (2)$$

$$f(T) \leq \text{cache capacity} \quad (3)$$

where G is a nonlinear function, B_i is the loop bounds of loop i, Ti represents the tile size of loop I, T is the tile formed by the set {Ti| for all i}, and f(T) represents the memory foot print of the tile.

In Equation 2, the term $$\prod_{i=0}^{n} \frac{B_i}{T_i}$$

defines total number or tiles and function $f(T)$ defines the data size for each tile. Additionally, a non-linear function G is defined in order to describe the DMA transfer cost given that a DMA's efficiency is also influenced by other parameters such as burst size and strides, and not solely limited to data size. G may also be defined such that it includes a representation of the execution efficiency for future vectorization consideration. Vectorization may therefore be considered in memory footprint calculations and cost estimations. Equation 3 represents a hard constraint that the tile T is required satisfy. Equations 2 and 3 can be evaluated recursively and the desired result can be determined to be the result with the minimal cost. In some instances, when two evaluated results have the same associated cost, the desired result may be considered to be the result which has the smallest total number of tiles associated therewith.

It is understood that to make an accurate calculation, or at least a good approximation, of the memory footprint of the tile in order mitigate the cache from being overloaded. It is further understood that it may further be desirable to use larger tiles in order to achieve a better performance. A tight bounding box may be used to calculate the active tensor precisely since a memory access may be sensitive to different loop axes. A tight bounding box (also referred to as a minimum bounding box), for a set of points, is a known algorithm for determining a box with the smallest measure (for example, area) that would enclose all of the points. Therefore, in a 2-dimensional array of memory locations serving as the active tensor, a tight bounding box may be used to determine the minimum measure of memory used for a particular computation configuration. In a scalar case, where all intermediate results are register-based, calculating the union of the memory region created by load and store instructions will provide an accurate calculation of the memory footprint. However, intermediate results must also be taken into account during computation when vectorization is considered. For example, in result=X+Y*Z, if T1=Y*Z, then result=X+T1. In this case, T1 is taken into the active tensor memory footprint calculation, otherwise the memory footprint estimated will be less than the actual data during execution time and the buffer will be overloaded.

In the case of static loop bounds, for each i, $B_i$ is known and $T_i$ is a variable to be solved. Through analysis on the memory access patterns, an expression of f(T) will be found. A memory access pattern is the pattern in which a computer system or computer program may read and write memory. Such existence of patterns may be exploited to enhance efficiency, even in computer memory that is described as random access memory. A particular property exhibited by memory access patterns is locality of reference, which is a predictable behaviour in computer systems, and one which may be utilized for performance optimization.

In the case of mixed dynamic and static loop bounds and dynamic data shapes, the cost function is modified. In the term $$\prod_{i=0}^{n} \frac{B_i}{T_i},$$

if $B_i$ is not known as compile time, it is not included in the accumulation, and $T_i$ is set to one when calculating f(T). It is noted that if $B_i$ is unknown at compile tile, then it would be impossible to determine the total number of tiles. However, if $B_i$ is not known at compile time, but the memory data shape is known, then $B_i$ may be replaced with the dimensions of the memory data shape. The solution may then be searched for using the same approach as the static memory data shapes case, whereby the build cost model may be built to solve for the tile sizes while setting the loop tile size setting to one. After determining the result for the static portion, the tile size is adjusted for the intermediate enclosing dynamic loop in order to determine the largest size in one outer dimension that can fit into the cache. That is, the tile size is increased from the initial one to two (or to some other larger size), while still ensuring that it fits into the memory cache.

In other words, dynamic adjustment of the loop tile size is only performed on the immediately enclosing dynamic loop, while the non-immediate enclosing dynamic loop will remain to be tiled-by-one. This can allow for incremental increasing of the tile size until a maximum size is found that still fits within the desired memory cache size.

If all the data shapes are static, in $$\prod_{i=0}^{n} \frac{B_i}{T_i},$$

non-static $B_i$ is replaced by the smallest value of the array data shape determined by inferring the loop bounds with array data shapes. The tile sizes. $T_i$s, are thus determined purely by using the build cost model to solve for the tile sizes. This is a safe action as the loop counts cannot exceed the array data shape bounds, in other words, the actual memory footprint≤f(T)≤cache capacity.

In the case of all dynamic loop bounds, and when information about the data shapes is unavailable, a conservative tiling method is chosen to only tile the innermost loop. A default tile size will be applied to the innermost loop and the outer loops will be tiled by one. It's a trade-off between performance and functionality. But it's guaranteed to be safe for the cache. If all the data shapes are static, a similar approach is taken as the case of half-static loop bounds. A build cost model is built and in the term $$\prod_{i=0}^{n} \frac{B_i}{T_i},$$

$B_i$ will be replaced by the smallest possible value inferred from access dependency and data shapes. $T_i$s are solved normally after the build cost model is built.

After getting the tiled loop, insert the DMAs if needed from outer loop inward. As the solution T satisfies the constraint that f(T)≤cache capacity, DMAs calls should be safely inserted.

The method may be implemented in a multi-pass compiler infrastructure as an optimization pass where, for example, some form of capacity constraint (such as a cache size limitation) has to be met. Multi-pass compilation refers to the multiple passes a compiler must make over a source program to compile it into a low-level target program. In multi-pass compilation, there are typically sophisticated optimization passes that are also performed to generate high quality code. The build cost model may thus be used to determine the desired tiling within the cache capacity constraint that must be met. As an example, according to embodiments, the method may be implemented in MLIR affine dialect, or implemented in LLVM compiler backend as a loop optimization pass.

Figure 4A:
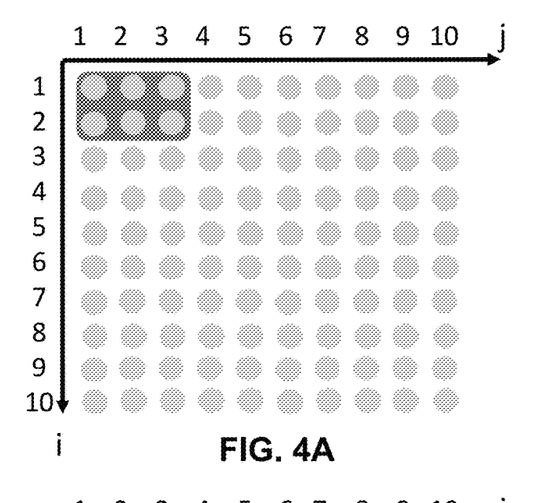
FIGS. 4A, 4B, 4C and 4D depict example tiling scenarios, according to embodiments.
Figure 4B:
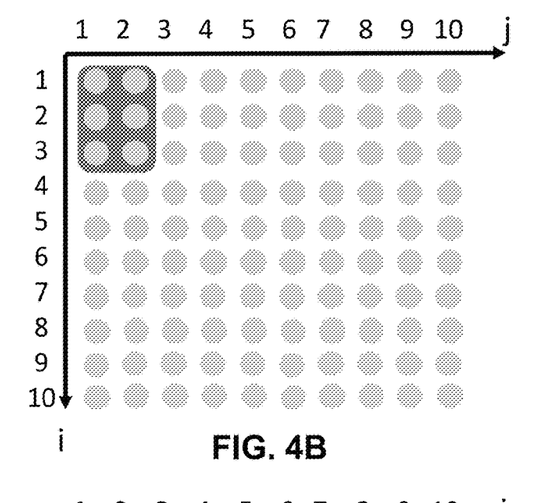
Figure 4C:
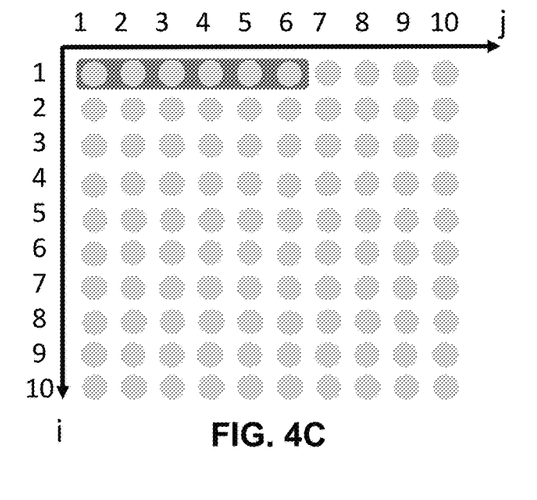
Figure 4D:
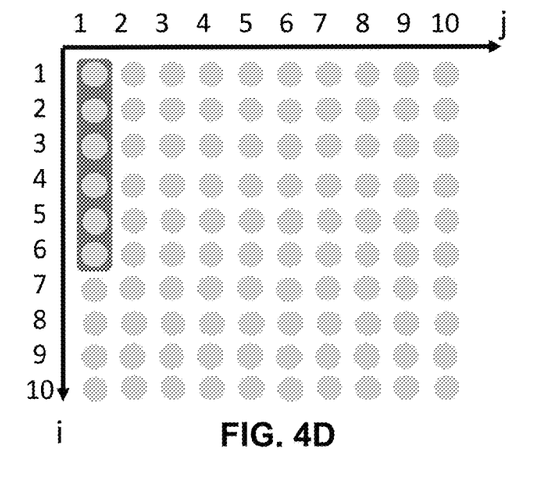

FIGS. 4A, 4B, 4C and 4D depict various exemplary tiling scenarios for a case with static loop bounds, producing the same amount of memory on a 10 by 10 array containing 100 elements. In FIGS. 4A, 4B, 4C and 4D it is assumed that the cache size is 20. In FIG. 4A, $T_i$ is set to two, while $T_j$ is incremented until the maximum memory footprint (shaded portion) is achieved that is still less than or equal to the cache limitation of 20. FIG. 4B is similar to FIG. 4A, having instead set $T_j$ to two and allowing $T_i$ to increment until the maximum memory footprint is achieved. FIGS. 4C and 4D illustrate similar scenarios, but where one of $T_i$ or $T_j$ is set to one, while the other is incremented. It should be noted that in each of FIGS. 4A, 4B, 4C and 4D, the total memory footprint is three times the product of the $T_i$ and $T_j$ values, as it is assumed that there are three 10 by 10 arrays containing 100 elements each in this specific situation (for example, a nested 'for' loop may contain an instruction that adds the values of two arrays into a third array: C[ii, jj]=A[ii, jj]+B[ii, jj], so each of A, B and C are a 10 by 10 array containing 100 elements). An example 'for' loop is provided below:

for (int i=0; i<10; i+=Ti)
      for (int j=0; j<10; j+=Tj)
        for (int ii=i; ii<i+Ti; ++)
          for (int jj=j; jj<j+Tj; jj++)
            C[ii, jj]=A[ii, jj]+B[ii, jj];

Based on the initial conditions provided in relation to loop bounds and data shapes, the algorithm based on the build cost model disclosed herein may be able to tile the DMA appropriately. Where, like in FIGS. 4A, 4B, 4C and 4D, the overall memory size is the same, the build cost model may be able to further choose which arrangement is best suited to the situation.

Figure 5:
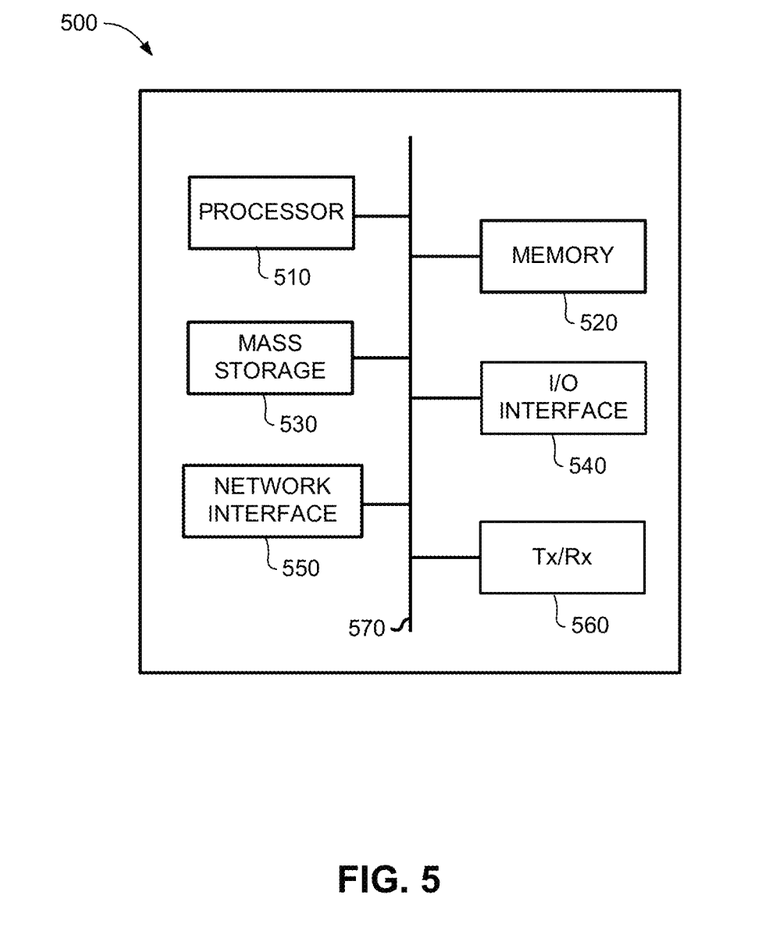
FIG. 5 depicts a block diagram of a user equipment used for implementing methods disclosed herein, according to embodiments.

FIG. 5 is a schematic diagram of an electronic device 500 that may perform any or all of the steps of the above methods and features described herein, according to different embodiments of the present disclosure. For example, a user equipment (UE), base transceiver station (BTS), base station, wireless gateway or mobility router may be configured as the electronic device. It may be noted that the term "BTS" or "base station" refers to an evolved NodeB (eNB), New Radio (NR) or next generation NodeB (gNodeB or gNB), a radio access node, or another device in a wireless communication network infrastructure, such as a long term evolution (LTE) infrastructure, NR or 5G infrastructure, which performs or directs at least some aspects of wireless communication with wireless communication devices. The term "UE" refers to a device, such as a mobile device, machine-type-communication (MTC) device, machine-to-machine (M2M) equipment, Internet of Things (IoT) device, Internet of Vehicles (IoV) device or other device, which accesses the wireless communication network infrastructure via wireless communication with a base station.

As shown, the device includes a processor 510, memory 520, non-transitory mass storage 530, I/O interface 540, network interface 550, and a transceiver 560, all of which are communicatively coupled via bi-directional bus 570. According to certain embodiments, any or all of the depicted elements may be utilized, or only a subset of the elements. Further, the device 500 may contain multiple instances of certain elements, such as multiple processors, memories, or transceivers. Also, elements of the hardware device may be directly coupled to other elements without the bi-directional bus.

The memory 520 may include any type of non-transitory memory such as static random access memory (SRAM), dynamic random access memory (DRAM), synchronous DRAM (SDRAM), read-only memory (ROM), any combination of such, or the like. The mass storage element 530 may include any type of non-transitory storage device, such as a solid state drive, hard disk drive, a magnetic disk drive, an optical disk drive, USB drive, or any computer program product configured to store data and machine executable program code. According to certain embodiments, the memory 520 or mass storage 530 may have recorded thereon statements and instructions executable by the processor 510 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the methods described herein can be implemented as coded instructions in a computer program product. In other words, the computer program product is a computer-readable medium upon which software code is recorded to execute the methods when the computer program product is loaded into memory and executed on the microprocessor of the wireless communication device.

Acts associated with the methods described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the methods may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method comprising:
receiving information indicative of a set of loop bounds and a set of data shapes;
processing the information to determine a computation configuration based on the information, the computation configuration being compiler implementable, said processing including evaluating at least the computation configuration based on a build cost model, the build cost model representative of a data transfer cost and a data efficiency of the computation configuration; and
transmitting an instruction directing a compiler to implement the computation configuration;
wherein the build cost model includes an objective function and a constraint size, the objective function indicative of a total dynamic memory allocation transfer cost and the constraint size indicative of a capacity of a cache.

2. The method of claim 1 wherein each loop bound of the set of loop bounds is static.

3. The method of claim 1 wherein a subset of the set of loop bounds is static and a subset of the subset of loop bounds is dynamic.

4. The method of claim 3 wherein each data shape of the set of data shapes is static.

5. The method of claim 3 wherein each data shape of the set of data shapes is dynamic.

6. The method of claim 1 wherein each loop bound of the set of loop bounds is dynamic.

7. The method of claim 6 wherein each data shape of the set of data shapes is static.

8. The method of claim 6 wherein each data shape of the set of data shapes is dynamic.

9. The method of claim 1 wherein the build cost model further includes a data size of a tile that is less than or equal to the constraint size.

10. A computing device comprising:
a processor; and
a non-transient computer readable memory having stored instructions which when executed by the processor configure the device to:
receive information indicative of a set of loop bounds and a set of data shapes;
process the information to determine a computation configuration based on the information, the computation configuration being compiler implementable, said processing including evaluating at least the computation configuration based on a build cost model, the build cost model representative of a data transfer cost and a data efficiency of the computation configuration; and
transmit instructions directing a compiler to implement the computation configuration;
wherein the build cost model includes an objective function and a constraint size, the objective function indicative of a total dynamic memory allocation transfer cost and the constraint size indicative of a capacity of a cache.

11. The device of claim 10 wherein each loop bound of the set of loop bounds is static.

12. The device of claim 10 wherein a subset of the set of loop bounds is static and a subset of the subset of loop bounds is dynamic.

13. The device of claim 12 wherein each data shape of the set of data shapes is static.

14. The device of claim 12 wherein each data shape of the set of data shapes is dynamic.

15. The device of claim 10 wherein each loop bound of the set of loop bounds is dynamic.

16. The device of claim 15 wherein each data shape of the set of data shapes is static.

17. The device of claim 15 wherein each data shape of the set of data shapes is dynamic.

18. The device of claim 10 wherein the build cost model further includes a data size of a tile that is less than or equal to the constraint size.

* * * * *